Aug. 6, 1963  G. J. GROTT  3,099,868
METHOD FOR MANUFACTURING CAST WELDING RODS
Filed Oct. 10, 1960  4 Sheets-Sheet 1
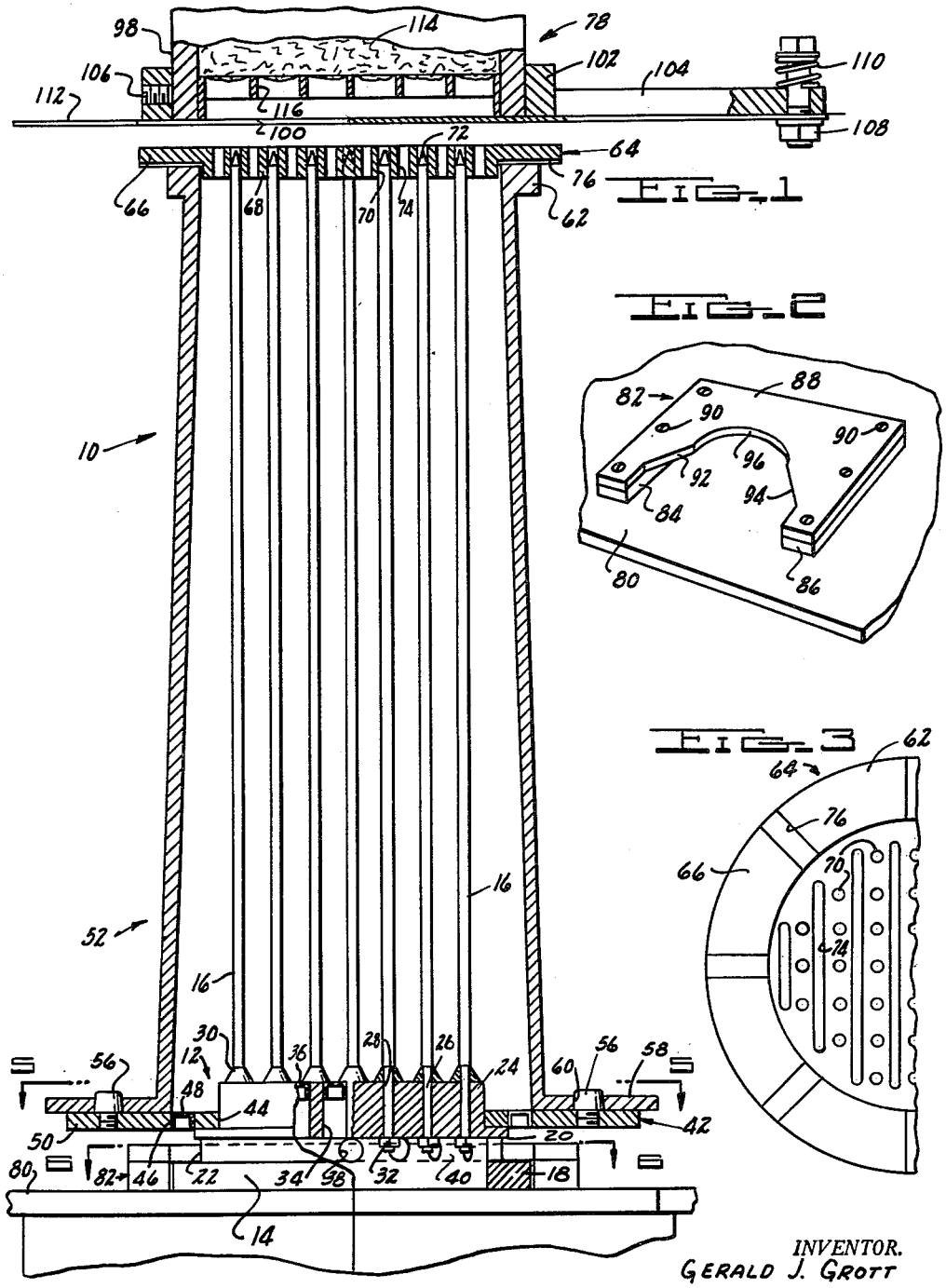
INVENTOR.
GERALD J. GROTT
BY
WILSON, SETTLE, McRAE & CRAIG
ATTORNEYS Aug. 6, 1963 G. J. GROTT 3,099,868
METHOD FOR MANUFACTURING CAST WELDING RODS
Filed Oct. 10, 1960 4 Sheets-Sheet 2
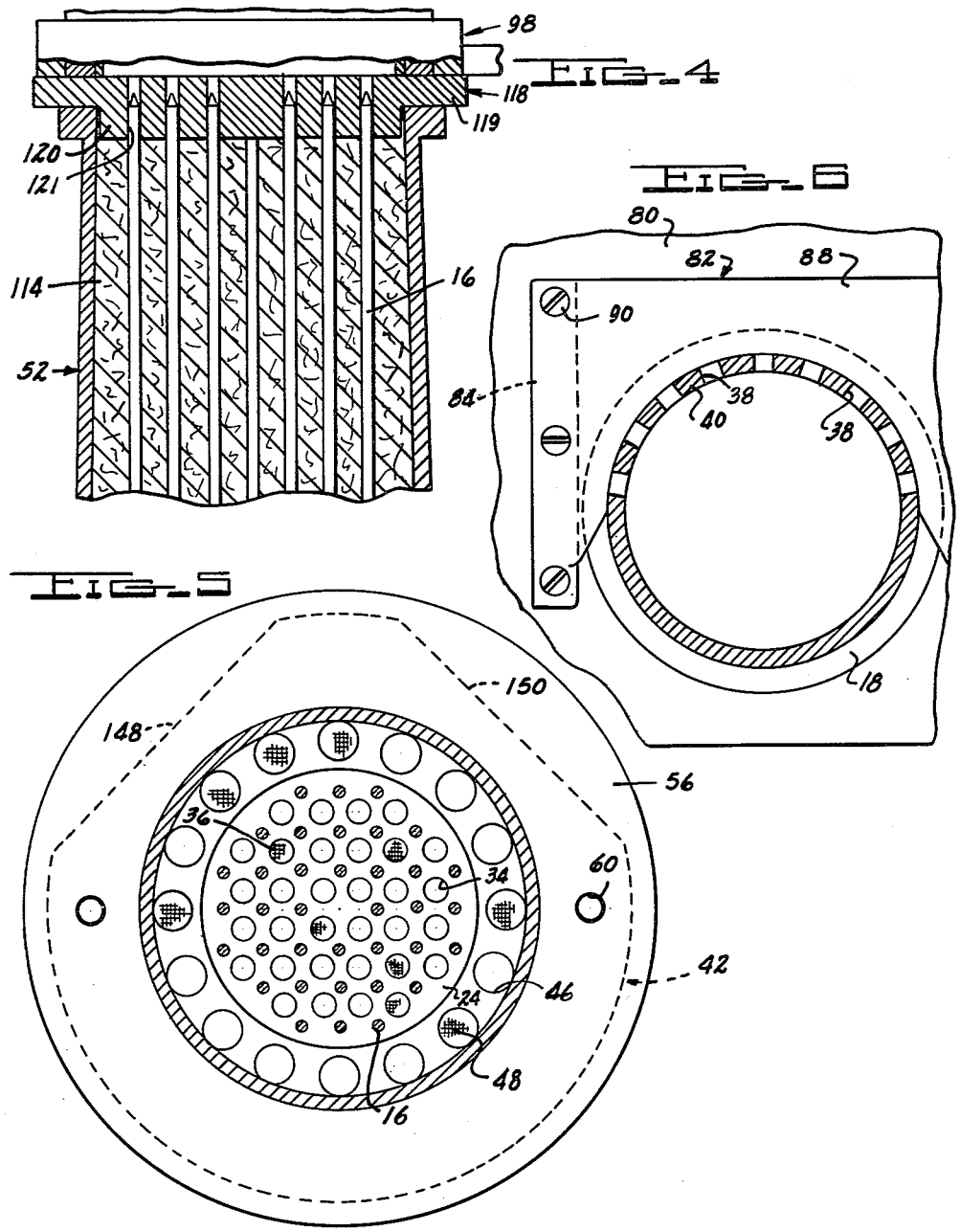
INVENTOR.
GERALD J. GROTT
BY
WILSON, SETTLE, McRAE & CRAIG
ATTORNEYS Aug. 6, 1963  G. J. GROTT  3,099,868
METHOD FOR MANUFACTURING CAST WELDING RODS
Filed Oct. 10, 1960  4 Sheets-Sheet 3
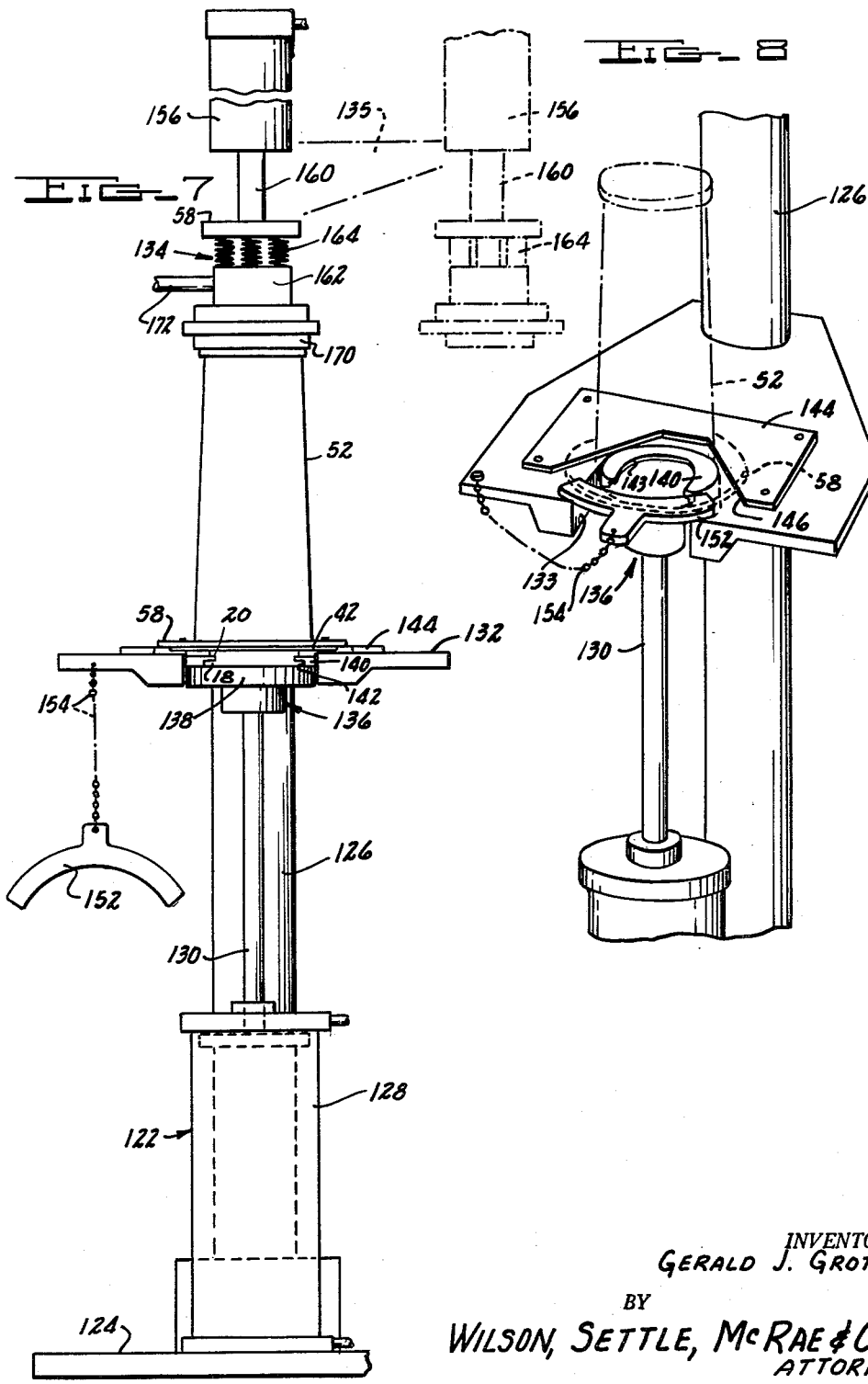
INVENTOR.
GERALD J. GROTT
BY
WILSON, SETTLE, McRAE & CRAIG
ATTORNEYS Aug. 6, 1963   G. J. GROTT   3,099,868
METHOD FOR MANUFACTURING CAST WELDING RODS
Filed Oct. 10, 1960   4 Sheets-Sheet 4
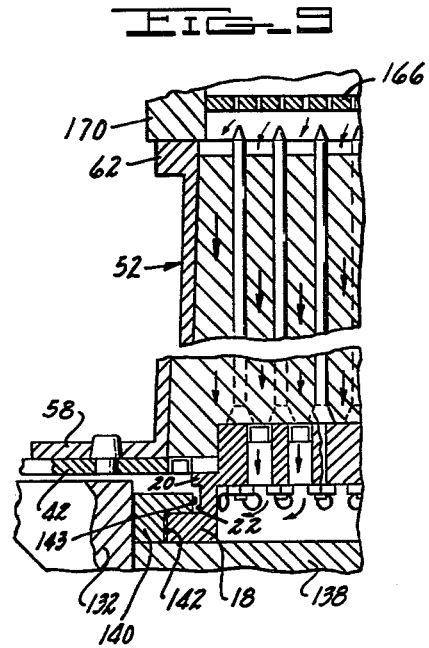
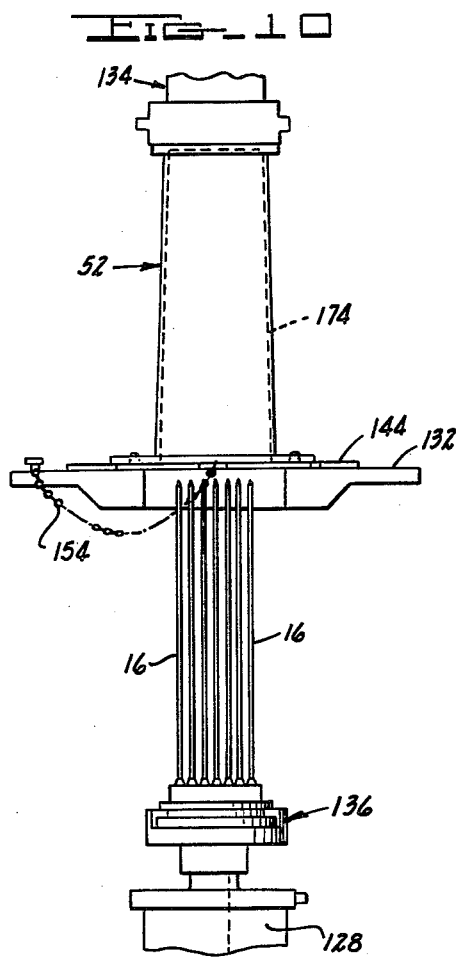
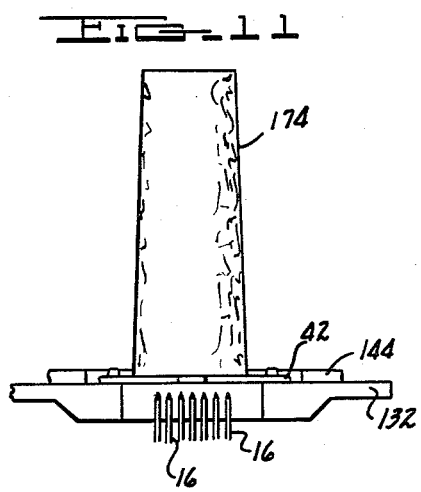
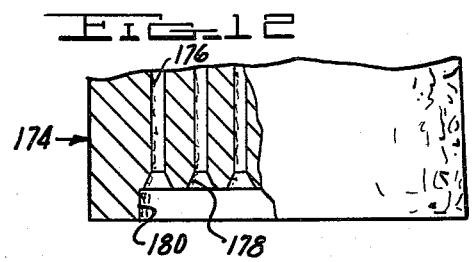
INVENTOR.
GERALD J. GROTT
BY
WILSON, SETTLE, McRAE & CRAIG
ATTORNEYS United States Patent Office 3,099,868
Patented Aug. 6, 1963

3,099,868
METHOD FOR MANUFACTURING CAST WELDING RODS
Gerald J. Grott, Warren, Mich., assignor, by mesne assignments, to Howe Sound Company, New York, N.Y., a corporation of Delaware
Filed Oct. 10, 1960, Ser. No. 61,548
3 Claims. (Cl. 22—194)

This invention relates to a method and apparatus for making a sand mold, and more particularly to a method and apparatus for making a unitary sand mold for casting a plurality of welding rods simultaneously.

As used herein, the term "welding rods" refers to the metallic rods used, for example, in welding to join two parts together, or to rods used to provide a hard surface layer on a base of softer metal. In the art of making welding rods, it is common practice to make some welding rods by the casting process. The type of welding rods which are made by the casting process usually are rods fabricated from a special metal which is not available as a standard mill product.

Conventional casting technique for producing welding rods involves the use of two-part molds. Steel or graphite split molds and shell molds are commonly used. The shell molding technique is disadvantageous in that such molds tend to spread apart at the parting line if the casting pressure is very high. The tendency to spread at the parting line particularly exists when the mold cavity is in a horizontal position and is amplified by the centrifugal casting processes often used. If it is desired to cast a standard fourteen inch welding rod with the mold cavity in a vertical position, there will be approximately three-tenths of a pound per square inch of static pressure and the dynamic pressure will be two to five times that of the static pressure. It is difficult to make a shell mold capable of withstanding such pressures and at the same time to produce a satisfactory welding rod. Casting by the shell molding method usually results in many pieces substantially less than fourteen inches in length, particularly for small diameter rods. This is because of the inability of the shell mold to withstand metal pressures high enough to cause the mold cavity to fill. Steel and graphite split molds have the disadvantage of a high initial cost, making it difficult to keep the cost of the welding rods within competitive limits. Additionally, steel and graphite split molds, which may be considered to be permanent-type molds, eventually warp and must be discarded.

Another disadvantage common to two-part molds is the difficulty in obtaining perfect alignment when the mold parts are assembled. Slight off-registry along the parting line produces cast rods having a non-circular cross-section. This creates a difficulty in cleaning and finishing operations, particularly with the harder alloys which are difficult to grind.

These problems are overcome according to the present invention by the provision of conventional sand molds which are capable of producing satisfactory welding rods, which may be fourteen inches or greater in length, at a reasonable cost.

An object of the invention is to provide a method and apparatus for producing a unitary sand mold for casting a plurality of welding rods.

Another object of the invention is to provide a knock-down mold box assembly which may be utilized in connection with conventional sand filling machines and conventional gassing machines to produce a unitary sand mold for casting welding rods.

A further object of the invention is to provide means on a standard sand filling machine for facilitating mounting of a knock-down mold box assembly to permit filling of the mold box with sand.

An additional object of the invention is to modify a standard gassing machine to permit mounting of a knock-down mold assembly thereon and to provide means for separating the component parts of the mold box assembly after the gassing operation.

Other objects of this invention will appear in the following description and appended claims, reference being had to the accompanying drawings forming a part of this specification wherein like reference characters designate corresponding parts in the several views.

In the drawings:

FIGURE 1 is a side elevational view in section of one embodiment of the mold box assembly of the present invention shown mounted in a sand filling machine;

FIGURE 2 is a view in perspective of clamp and locator means provided on the sand filling machine table to facilitate mounting of the mold box assembly;

FIGURE 3 is a partial bottom plan view of a blow plate forming a part of the mold box assembly of FIGURE 1;

FIGURE 4 is a partial side elevational view in section of the mold box assembly showing a squeeze plate mounted therein to pack the mold after it is filled with sand;

FIGURE 5 is a sectional view taken substantially along the line 5—5 of FIGURE 1 looking in the direction of the arrows;

FIGURE 6 is a sectional view taken substantially along the line 6—6 of FIGURE 1 looking in the direction of the arrows;

FIGURE 7 is a front elevational view of a typical gassing machine for hardening the mold;

FIGURE 8 is a view in perspective of the gassing machine of FIGURE 7 showing the mold box assembly mounted thereon;

FIGURE 9 is a partial sectional view of the mold box assembly showing the paths taken by the gas passing therethrough during the gassing operation;

FIGURE 10 is a view showing the pattern withdrawn from the mold box assembly;

FIGURE 11 is a view of the finished mold with the mold box assembly removed; and FIGURE 12 is a partial view of a finished mold with a portion broken away to show the interior thereof.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The mold box assembly 10 utilized in accordance with the present invention is best seen in FIGURE 1. The assembly includes a pattern 12 comprising a base 14 to which is secured a plurality of upstanding rod pattern elements 16. The base, which is generally circular, consists of a first circumferential flange 18 and a second circumferential flange 20 of smaller diameter spaced upwardly therefrom. A circumferential recess 22 is formed between the two spaced flanges. A cylindrical projection 24 is provided on the upper portion of the base. The projection 24 is tapered inwardly towards the top to facilitate easy removal from a finished mold. The function of projection 24 is to form a pouring basin in the finished mold.

The rods 16 have reduced portions 26 which extend through openings 28 in the pattern base. As best seen in FIGURE 5, the openings 28 are spaced apart a sufficient distance so that the wall portions of the mold between the cavities formed by the rods 16 are of sufficient thickness to have the necessary strength characteristics to permit the handling and casting of metal into the mold without premature collapse of the mold.

The rod elements 16 are each provided with a conical element 30 in abutment with the upper surface of the projection 24. The elements 30 form pouring cups for the rod cavities. The rods 16 are threaded at their lower ends to receive nuts 32 for securement to the pattern base. The rods 16, being removable, may be replaced by other rods of different diameter to permit making molds for different sized rods.

The interior of the pattern base is hollowed out and a second set of openings 34 are provided in the projection 24 between the rod openings 28. Each opening 34 is provided with a screen element 36 to block the passage of sand but to permit the passage of air while the mold box is filled with sand as will be later described. Another set of openings 38 are provided in wall 40 of the base. The function of the openings 38 is to complete a path for gas to escape from the mold during the sand filling and gassing operations to be later described. The openings 38 are spaced apart and extend only over half the circumference of the wall 40.

Seated on the flange 20 of the pattern base is a vent plate 42. The vent plate has a central opening 44 for insertion over the base projection 24. As shown in FIGURES 1 and 5 circumferentially spaced vent openings 46 are provided in the vent plate at a point adjacent the outer periphery of the base flange 20. A screen element 48 is provided in each vent opening. The vent openings serve for the passage of gas similar to the openings 34. The outer portion 50 of the vent plate extends for a distance beyond the flange 20 to form a seating surface for a mold box 52. The outer portion 50 of the vent plate has two diametrically opposed threaded openings for threadingly receiving locating pins having tapered heads 56 for locating the mold box.

The mold box 52 is an open ended tapered tubular structure having a diameter sufficient to fit around the rod pattern elements. The lower end of the mold box is provided with a circumferential flange 58 to seat on the vent plate. Diametrically opposed tapered openings 60 are provided in the flange 58 to receive the locator heads 56. The upper end of the mold box is also provided with a reinforcing circumferential flange 62.

Receivable in the upper end of the mold box is a circular blow plate 64 shown in FIGURES 1 and 3. The plate 64 has a flange portion 66 for seating on the upper flange 62 of the mold box. A reduced portion 68 of the blow plate extends into the mold box. The blow plate is provided with a plurality of openings 70 which are in registry with the openings 28 of the base plate. Blow plates having different diameter openings 70 may be provided in the event that rod elements 16 of different diameters are used. The openings 70 receive the upper ends of the rod elements 16. As will be noted, the upper end of each rod element is pointed as at 72 for easy insertion into the blow plate openings. The blow plate is also provided with elongated openings 74 as shown in FIGURE 3 for injection of sand into the mold box assembly. Radially extending recesses 76 are provided in the underside of the portion 66 to permit the passage of air under pressure from the upper portion of the mold box assembly during the sand filling operation. A very small clearance is provided between the inner wall of the mold box and the reduced portion 68 of the blow plate to permit air under pressure to pass thereby. The clearance is, however, small enough to block the passage of sand particles.

The mold box assembly is filled with sand by means of the device 78 illustrated in FIGURE 1. Such devices are commonly referred to as "sand core blowing devices," however, it will be appreciated that by the present invention it is not intended to produce a core. One such core blowing device is disclosed in Patent No. 2,468,672, issued to Julius S. Judell, April 26, 1949. Core blowing devices generally comprise a hopper fed sand magazine which is subjected to air pressure to blow sand into a mold box assembly to fill the space around the pattern contained therein. The sand blowing device 78 includes a vertical movable table 80 which is moved up and down by a power cylinder (not shown).

The mold box assembly is assembled on the movable table 80 with the table in a retracted lower position. In assembling the mold box assembly, the base plate of the pattern is first clamped to the movable table. As will be noted in FIGURE 2, a base plate locator clamp 82 is provided on the table. The clamp 82 comprises two parallel bars 84, 86 and a locator plate 88. Screws 90 secure the assembly to the table. The plate 88 is provided with a recess having inwardly converging surfaces 92, 94 which terminate in an arcuate portion 96. The base plate is inserted into the clamp with the lower flange 18 extending beneath the plate 88 and the base recess 22 in abutment with the arcuate portion 96. The upper flange 20 extends over the plate 88 to thus locate the mold box assembly directly beneath the sand magazine 98. As will be noted in FIGURE 6, the openings 38 of the base plate are positioned to face towards the sand blowing device 78. The purpose of this is to prevent the machine operator from being subjected to a stream of air and sand particles during filling of the mold box.

The vent plate, mold box and blow plate are then assembled on the pattern to complete the mold box assembly. The table 80 may then be raised to a position adjacent the sand magazine 98 as shown in FIGURE 1. The sand magazine is provided with a sand retainer plate 100 which blocks the outlet opening of the sand magazine during periods of non-use. Mounting means for the retainer plate 100 comprise a retainer ring 102 which is secured to the sand magazine by means of a set screw 106. The sand retainer plate 100 is mounted on an arm 104 of the ring 102 by means of a nut and bolt assembly 108. A spring 110 is provided on the shank of the bolt to permit the sand retainer plate to be pivoted but cause sufficient frictional engagement to hold the plate in a selected position. Just prior to filling the mold box assembly, the sand retainer plate is pivoted out of its blocking position by means of a handle 112. When the sand retainer plate is pivoted from the sand magazine opening, the sand 114 will still not fall freely through from the magazine because its passage is partly blocked by a grid structure 116. After the retainer plate has been moved, the table is raised to a point where the blow plate 64 abuts against the sand magazine opening. At this point, sand is blown from the machine to fill the mold box assembly.

The entrained sand will follow the path of the air. Therefore, in order to get an even fill of sand in the mold box, the air should flow uniformly through all of the interior of the mold box. As previously mentioned, the air which carries the sand escapes from the bottom of the mold box assembly to atmosphere. It is thus important that air escape openings be provided in the vent plate as well as in the pattern base plate. This arrangement assures an even fill of the mold box assembly. Air passing through the vent plate openings 46 is dissipated directly to atmosphere. Air passing through the pattern base plate openings 34 is dissipated to atmosphere through openings 38. Very little sand will pass through the screens provided in the various openings, sand of only the smallest particle size being transmissible through the screens. As previously mentioned, dangerous pressure conditions cannot exist at the upper portion of the mold box assembly because pressure is relieved through the recesses 76 of the blow plate.

The sand used to fill the mold contains mixed therewith a solution comprising essentially sodium silicate. The sodium silicate in an aqueous solution is mixed with clean common susbtantially dry sand. The function of the sodium silicate is to form a gel to harden the mold. This will occur when the sodium silicate is contacted with carbon dioxide. This process is well known in the art and one example of such a process is disclosed in Patent No. 2,874,428, issued to John L. V. Bonney, Jr., on February 24, 1959.

After the mold box assembly has been filled with sand, the table 80 is lowered and the blow plate removed. A second plate 118, termed a "squeeze plate" is then mounted on the upper end of the mold box. The squeeze plate has a circumferential flange 119 for seating on the mold box and a reduced portion 120 for insertion into the mold box. The portion 120 has openings 121 to receive the upper ends of the rods 16. The function of the portion 120, which is thicker than the reduced portion 68 of the blow plate, is to squeeze and pack the sand in the mold box. After the squeeze plate has been mounted, the table 80 is raised into abutment with the sand magazine whereupon the reduced portion 120 compresses the sand in the mold box.

After the squeezing operation, the mold box assembly is removed from the sand blowing device and mounted on the gassing machine 122 shown in FIGURE 7. During the gassing operation, the squeeze plate 118 may either be removed or allowed to remain as part of the mold box assembly. The gassing machine 122 comprises a base 124 upon which is mounted a main machine support post 126. The base also carries a power cylinder 128 having a piston 130 upon which is mounted a clamp 136 to hold the mold box assembly. A fixed table 132 is mounted on post 126 intermediate the upper and lower ends. The table 132 has an opening 133 to permit the clamp 136 to be positioned level with the table top. The post 126 also carries a horizontally movable gas head 134. As shown in dotted lines in FIGURE 7, the gas head 134, which is carried on arm 135, may be pivoted away from a position over the table 132 to permit the insertion of the mold box assembly.

The mold box assembly is mounted on the gassing machine with the clamp 136 in the position shown in FIGURE 7. In this position, the upper surface of the clamp 136 is slightly above the surface of the table 132. The clamp comprises a base member 138 having a partial ring member 140 secured thereto. The ring member 140 has recess 142 to receive the lower flange 18 of the pattern base. The recess 22 of the pattern base fits into the arcuate portion 143 of the clamp 136, and the upper flange 20 of the pattern base rests on the top surface of the ring member 140.

A locating plate 144 is secured to the table 132. The locating plate 144 has a V-shaped recess 146 for receiving and locating the mold box assembly with respect to the gas head 134. As will be noted in FIGURE 5, flats 148, 150 are provided on the vent plate 42. These flats fit into the V-shaped recess to locate the mold box assembly. As a result of the clamp 136 being positioned above the table 132, the vent plate is also above the table.

Positioning of the mold box assembly in the gassing machine is completed by means of a ring portion 152. The ring portion 152 is secured to the table 132 by means of a flexible chain 154. This arrangement prevents the ring from being lost or misplaced. The ring portion 152 is inserted beneath the flange 58 of the mold box. This flange thus rests on the plate 144 and the ring 152 to insure that the mold box assembly will be level. It is important that the mold box assembly be oriented in a substantially vertical position so that when the pattern 12 is withdrawn from the finished mold, the draw will be straight and not enlarge or damage the voids in the mold.

Once the mold box assembly has been mounted in the gassing machine, the gas head 134 is swung into position directly overhead and the power cylinder 156, to which the gas head is mounted, is operated to cause the gas head to be lowered into abutment with the upper end of the mold box assembly. As will be noted, the gas head comprises a plate 158 which is secured to piston 160 of the power cylinder. A hollow cylinder 162 is mounted to the plate 158 by means of springs 164. The cylinder 162 is closed at the top and open at the bottom to direct gas into the mold box assembly. As shown in FIGURE 9, a perforated plate 166 is provided within the gas head to direct the flow of gas into the mold box assembly. A ring 170 is provided on the lower portion of the gas head cylinder 162. The ring 170 is fabricated from a resilient material, such as neoprene, to effect an air-tight seal with the upper flange 62 of the mold box assembly. This seal is effectuated by the spring mounting of the cylinder 162. When the power cylinder 156 moves the cylinder 162 into abutment with the upper end of the mold box assembly, any cant of the cylinder 162 with respect to flange 62 will be compensated for by the springs 163.

Carbon dioxide is supplied to the cylinder 162 under pressure through tube 172 which extends into the cylinder. Carbon dioxide is applied for a preselected timed interval. This time may be varied depending upon the particular type of sand mixture used and the pressure under which the gas is injected. As shown in FIGURE 9, the gas will pass through plate 166, through the sand within the mold box, and thence out through the openings in the vent plate and in the pattern base plate to atmosphere. Carbon dioxide, being non-poisonous, may be expelled directly to the atmosphere. As in the case of filling the mold with sand, the gas is evenly dispersed throughout the sand by means of the plurality of openings in both the vent plate and pattern base plate.

After the gas has been applied, the power cylinder 128 is operated to retract the clamp 136 to its lowermost position. The clamp 136 will initially draw the pattern base vent plate and the now formed sand mold from the mold box downwardly to release the sand mold from the mold box. The mold will be drawn downwardly until the vent plate abuts against the table 132. At this point, the rod elements 16 will continue downwardly and be withdrawn from the mold 174 as shown in FIGURE 10. The gas head 134 may then be raised and moved out of position as shown in FIGURE 7. The mold box 52 is then removed to expose the finished mold 174 as shown in FIGURE 11. The mold now has cavities 176 formed therein in the shape of the rod elements as illustrated in FIGURE 12. Each cavity 176 has a conical cavity 178 to form a pouring cup for each rod to be cast and a large pouring basin 180 is formed in the mold. When the metal is cast into the mold, it will be appreciated that it will be cast first into the basin 180, thence through the pouring cups 178 and on into the rod-shaped cavities 176.

The mold 174 may subsequently be dried in an oven to remove any vaporizable liquid such as water which may be trapped in the sand. Subsequent to drying, the mold is ready for casting.

While the filling of the mold box assembly has been described as being accomplished by means of a core blowing sand machine the filling operation may also be accomplished by the use of a conventional jolting and squeezing machine. However, the blowing technique is preferred. Additionally, the process may exclude the use of a hardenable binder such as sodium silicate. The sand may be merely blown into the mold box and squeezed to form the mold. However, the use of a binder is preferred because the resultant mold may be held to closer tolerances.

Sand hardening processes other than the sodium silica/carbon dioxide process may be employed if desired, however, this process is preferred. For example, acid-reacting substances such as hydrogen chloride may also be employed. Cold setting binders comprising drying type oils containing oxidizing agents and contacted with oxygen or ozone to form a hardened binder may also be used.

Having thus described my invention, I claim:

1. In a method of forming a mold for casting elongated rods of small diameter,
    the steps of positioning an elongated rod vertically within a downward draft mold box, in one step, charging sodium silicate coated sand from the top down into the mold and over and around the rod along its entire length to fill the mold and entirely embed the rod, in one step, compressing the sand from the top down in the filled mold, forcing carbon dioxide axially from the top through the compressed sand to harden the same, moving the hardened sand downwardly and out of the mold box while carrying the rod along, stopping the movement of the hardened sand, and then moving the elongated rod downwardly and out of the hardened sand.

2. In a method of forming a mold for casting elongated rods of small diameter, the steps of positioning an elongated rod in vertical axial alignment within a downward draft mold box, in a single step, charging sand containing a hardening agent into the mold box to entirely embed the rod, in a single step, compressing the sand in the filled mold, forcing a reactive gas through the compressed sand to set the sand to a hardened condition, moving the hardened sand downwardly out of the mold box while carrying the rod along, stopping movement of the hardened sand, and then moving the rod downwardly and out of the hardened sand.

3. In a method of forming a mold for casting elongated rods of small diameter, the steps of positioning an elongated rod in axial alignment within an axial draft mold box, in a single step, charging sand into the mold box to entirely embed the rod, in a single step, compressing the sand in the filled mold, hardening the compressed sand through the use of a reactive gas, moving the hardened sand as a unitary mass axially out of the mold while carrying the rod along, stopping movement of the hardened sand, and then moving the rod axially out of the hardened sand.

References Cited in the file of this patent

UNITED STATES PATENTS

| 798,897 | Griffith | Sept. 5, 1905 |
| 910,167 | Bonvillain | June 19, 1909 |
| 1,010,643 | Kramer | Dec. 5, 1911 |
| 2,886,865 | Leisk | May 19, 1959 |

FOREIGN PATENTS

| 18,262 | Great Britain | 1899 |

OTHER REFERENCES

Foundry publication, March 1956, pp. 104–109 relied upon.